United States Patent
Dodson et al.

(10) Patent No.: US 8,341,145 B2
(45) Date of Patent: Dec. 25, 2012

(54) FACE RECOGNITION USING SOCIAL DATA

(75) Inventors: Bradley Dodson, Seattle, WA (US);
David Nichols, Redmond, WA (US);
Chung Webster, Seattle, WA (US); Joel Scaria, Union, NJ (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/973,881

(22) Filed: Dec. 20, 2010

(65) Prior Publication Data

US 2012/0158700 A1    Jun. 21, 2012

(51) Int. Cl.
*G06F 7/00* (2006.01)
*G06F 17/30* (2006.01)

(52) U.S. Cl. .................... 707/722; 382/115; 382/190

(58) Field of Classification Search .................. None
See application file for complete search history.

(56) References Cited

U.S. PATENT DOCUMENTS

| | | | | |
|---|---|---|---|---|
| 7,783,085 | B2* | 8/2010 | Perlmutter et al. | 382/118 |
| 2005/0105803 | A1* | 5/2005 | Ray | 382/209 |
| 2006/0158307 | A1* | 7/2006 | Lee et al. | 340/5.53 |
| 2006/0251338 | A1* | 11/2006 | Gokturk et al. | 382/305 |
| 2006/0253491 | A1* | 11/2006 | Gokturk et al. | 707/104.1 |
| 2007/0172099 | A1* | 7/2007 | Park et al. | 382/118 |
| 2007/0172155 | A1* | 7/2007 | Guckenberger | 382/305 |
| 2008/0270425 | A1* | 10/2008 | Cotgreave | 707/100 |
| 2009/0175509 | A1* | 7/2009 | Gonion et al. | 382/118 |
| 2009/0196493 | A1 | 8/2009 | Widrow et al. | |
| 2010/0036875 | A1* | 2/2010 | Mieszianko et al. | 707/104.1 |
| 2010/0082677 | A1* | 4/2010 | Athsani et al. | 707/783 |
| 2010/0287053 | A1* | 11/2010 | Ganong et al. | 705/14.66 |
| 2010/0325218 | A1* | 12/2010 | Castro et al. | 709/206 |
| 2011/0085710 | A1* | 4/2011 | Perlmutter et al. | 382/118 |
| 2011/0182482 | A1* | 7/2011 | Winters et al. | 382/116 |
| 2011/0243449 | A1* | 10/2011 | Hannuksela et al. | 382/190 |

OTHER PUBLICATIONS

Purdy, Kevin, "Google Images Offers Search by Size and Face Recognition", Retrieved at <<http://www.lifehacker.com.au/2009/08/google-images-offers-search-by-size-and-face-recognition/>>, Aug. 4, 2009, pp. 1-4.

Casperson, Matthew, "Face.com Opens Free Facial Recognition API", Retrieved at <<http://blog.programmableweb.com/2010/05/04/face-com-opens-free-facial-recognition-api/>>,May 4, 2010, pp. 1-6.

(Continued)

*Primary Examiner* — Wilson Lee
*Assistant Examiner* — Jessica N Le

(57) ABSTRACT

Faces may be indexed and identified using visual and social criteria. In one example, the visual features of a face are quantified, and the quantification of the features is represented in a vector. Aspects of the vector are then represented in the form of text strings. Social context surrounding the face is also represented in the form of text strings. The text strings—both the visual-based strings and/or the social-based strings—are associated with the face, and are stored in an index. The association of these strings with the face then may make the face text-searchable on both its visual and social features. Searches on these visual and/or social features may be used to help to assist in identifying new images of faces, or to propose tags for users to apply to photos.

14 Claims, 4 Drawing Sheets

OTHER PUBLICATIONS

"Windows Live Search Images now Includes Facial Recognition Filters", Retrieved at http://www.online-tech-tips.com/industry-news/windows-live-search-images-now-includes-facial-recognition-filters/>>, Jul. 30, 2007, pp. 1-6.

"Picollator Hybrid Search Engine", Retrieved at <<http://www.recogmission.com/products/picollator>>, retrieval date: Sep. 14, 2010, 1 page.

Avinash, "Search Similar Faces on the Web using Face Recognition", Retrieved at <<http://www.avinashtech.com/internet/search-similar-faces-web-face/>>, Retrieved Date: Sep. 14, 2010, copyright date 2008-2010, pp. 1-5.

Gionis, et al., "Similarity Search in High Dimensions via Hashing", Proceedings of the 25th VLDB Conference, 1999, retrieved at <<http://www.cs.princeton.edu/courses/archive/spr06/cos592/bib/LSH-VLDB-gionis99.pdf>>, pp. 518-529, Edinburgh, Scotland.

* cited by examiner

FACE RECOGNITION USING SOCIAL DATA

BACKGROUND

Face recognition technology generally works by extracting a face from a photograph, and comparing the extracted face with known faces. Through this comparison, it may be possible to determine whether the extracted face belongs to the same person as the known faces. If the extracted face is found to be sufficiently similar to any of the known faces, then a conclusion is drawn that the extracted face is of the same person as the known face.

While visual face recognition techniques may be able to identify faces in certain circumstances, in many cases visual face recognition techniques are not sufficient to identify a face correctly. The images may be of poor quality, thereby making the features of the face difficult to discern. Two faces that are of different people may look similar to each other, and a visual face recognition process may guess the wrong face. Thus, visual face recognition alone may fail to identify faces correctly in some cases.

SUMMARY

Face recognition may be performed using both visual techniques and social network data. The use of social network data may be based on the observation that people generally tend to take pictures of, and to appear in pictures with, those whom they know. Thus social network data may be used to determine what connections people have with each other (with appropriate permission obtained in order to protect the privacy of the parties concerned). This knowledge of people's connections may then be used to help determine who appears in a photo.

In order to identify a face in a photo (which we will call "face A"), face A may be visually analyzed to create a digital representation of face A's features. That is, physical feature of face A may be quantified, and a vector may be created that represents the quantification of the facial features. Aspects of the vector may then be converted to text strings, thereby producing one or more text strings that represent face A. Additionally, text strings derived from social facts may be added to these text strings. For example, if face A was extracted from a photo that was uploaded by "Bob", and the photo has been tagged as containing "Joe" and "Susan", then these names are also text that may be added to the representation of the photo. So, if the strings that represent the visual appearance of the face are "eruiuwe", "dkruiwl", and "dkrudkt", then the text that represents both the visual and social aspects of face A may be "eruiuwe dkruiwl dkrudkt Bob Joe Susan."

Once text exists that represents face A, face A may be indexed using that text, and the index entry may later be used in a search. Thus, suppose that a new photo contains an unidentified face ("face B"). Visual analysis of face B may produce a vector, and conversion of that vector into text may produce a set of strings including "eruiuwe" (which is one of the strings that represents the visual appearance of face A). Additionally, it may be known that the photo was uploaded by Susan. Thus, a text search can be performed using the query "eruiuwe Susan". Since face A described in the preceding paragraph is indexed by both the strings "eruiuwe" and "Susan", face A would appear in the text search results as a potential match for face B. Since the search is based both on text terms that represent the visual appearance of the face, and also on text terms that represent the social context of the face, identification of the face in the search results may be based both on visual and social considerations. The actual decision as to whether face B matches face A may depend on the strength of the match, and on whether other indexed faces are stronger matches. In this way, ordinary text search techniques may be used to perform a face match.

In one example, the above technique may be used to search for photos of a particular person. In another example, the above technique may be used to suggest the identity of faces that appear in a photo, in order to assist users in tagging the photos.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
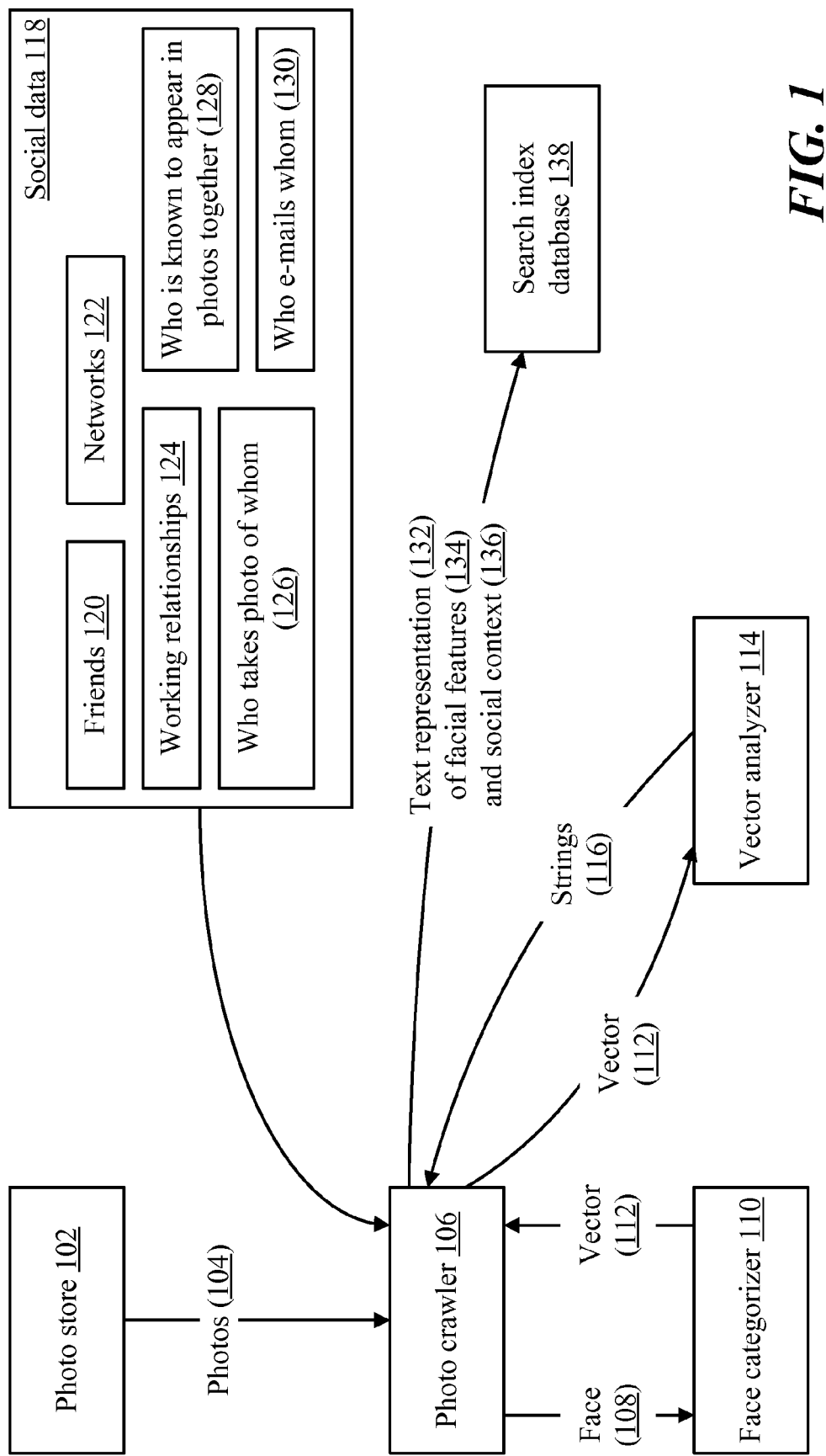
FIG. 1 is a block diagram of an example system in which faces may be analyzed and indexed.

Face recognition technology allows the people who appear in photos to be identified automatically. Typically, face recognition technology relies on visual analysis of a face. In order to perform this type of analysis, the region of the photo that constitutes a face is extracted from the photo, and is normalized to a particular size. The face is then analyzed to quantify particular aspects of the face. A vector containing these quantities is then created, where the vector represents the face. By creating vectors for several faces, it is possible to compare faces for similarity using vector-comparison techniques. Judgments may then be made about how similar two faces are, and these judgments may be used for a variety of applications. For example, a system that wants to recognize Joe in photographs might maintain a canonical image of Joe's face, and may quantify that face in the form of a vector. Then, faces in other images can be compared with Joe's face by creating vectors for those images and comparing the vectors for similarity. Faces that are sufficiently similar to the canonical image of Joe's face may then be deemed to be images of Joe.

However, face recognition that is based only on visual analysis has its limits. Faces are often extracted from imperfect images that have problems with blur, lighting occlusions, etc. Some people look similar to each other, so the quantification of facial features might lead to similar vectors for the faces of two different people. Moreover, when using visual mechanisms, the ability to identify, positively, a face as belonging to Joe depends on the existence of data about Joe's face (e.g., an canonical image of Joe against which new images may be compared). In some cases, that information does not exist. Or even if the raw information does exist, it might not have been extracted into a usable form.

The subject matter described herein uses social data to augment visual face recognition techniques. Social networks, and other systems through which people interact, provide rich data that can be used to identify faces in photos. The use of such data may be based on the observation that, if persons A and B know each other, then it is more likely that A will appear in a photograph with B than it would be for two random, unrelated people who do not know each other to appear in a photograph together. Similarly, if A knows B, then it is more likely that A would appear in a photograph taken by B, or in a photograph uploaded by B, or in a photograph that contains one or more tags entered by B. Thus, data about people's interactions with each other may be used to determine what relationships between people exist, and this data may be used to help identify faces in photos. (In order to preserve and respect people's expectations of privacy, the use of information about people may be used pursuant to appropriate permission and/or disclosures.) In addition to using information about who uploaded the photo or who appears in the photo, additional information can be used about the photo. For example, if two photos are in the same album, then it may be more probable that the same people appear in the photos that it would be for two randomly-selected photos. Moreover, if two photos were taken at nearly the same time and place, then it may be more probable that there are common faces in the photos than it would be for two randomly-selected photos.

One way of using social network and/or interaction data to identify faces is to make the visual features of a face, as well as the social context surrounding the face, text searchable. When a vector representing the facial features is created, one or more text strings based on the vector may be created. The text strings may be created through a "locality sensitive hash," so that faces that are similar to each other have vectors that tend to generate similar sets of text strings. Conversely, faces that are dissimilar to each other tend to generate dissimilar sets of text strings. Thus, if a photo of Joe's face is analyzed, the vector that represents quantification of Joe's facial features might be the n-dimensional vector <12.0, 5.6, 15.2, . . . >. The set of text strings that is generated from this vector might be "eruiuwe dkruiwl dkrudkt". These particular sequences of letters have no particular meaning in English, but they have a few properties that may assist in searching for the face later: (1) they are in the form of text, which makes them indexable and searchable through normal text-based index-and-search technologies, and (2) the strings may be created in such a way that two faces that are visually similar to each other will generate similar sets of strings. (It will be understood that "text strings" are not limited to strings that are in a natural language, or that use the alphabet or symbols of a natural language; rather, text strings may refer to any data that can searched using text-search techniques.)

Additionally, any social context that is known about a face may also be represented in the form of a text string. For example, if the photo of Joe's face was extracted from a photo that was uploaded by "Bob", and the photo has been tagged as also containing an image of "Susan", and the photo was e-mailed by "Mary", then these names are also text that may be added to the representation of the photo. Thus, the string that represents the photo might be "eruiuwe dkruiwl dkrudkt Bob Susan Mary Joe", which represents what is known about the face visually (through the first three terms), and also what is known about the face socially (through the last four terms). (Assuming that the face has been positively identified as being that of Joe, Joe's name may be included in this list; however, in theory, it would be possible to create a text string representing what is known about the face even if the face has not been identified. Knowing that a face was extracted from a photo that was uploaded by Bob, that contains Susan, and that was e-mailed by Mary provides relevant information about the face even if it is not yet known what person belongs to that face.) It is noted that the foregoing example shows all of the data by which the photo is indexed being concatenated together in an undifferentiated manner. However, it is also possible to specify fields for a given piece of data. For example, the first three text strings in the above example might be designated as part of the "visual information" field. Bob might be listed in the "uploaded-by" field. Susan might be listed in an "appears-in-image" field. And so on. Identifying the significance of each piece of data may assist in search strategies—e.g., if a particular search strategy considered it to be more significant that Susan appears in a photo with Joe, and less significant that Bob took the photo, then a search strategy could be devised that makes use of these fields.

Once the appropriate strings have been created that describe the face's visual features and social context, the face may be stored in a database, indexed by these strings. The indexing of the face by these strings makes the face text-searchable. That is, if an unidentified face is analyzed that happens to be similar to a face in the database, then visual analysis of the face may tend to produce some of the same strings that are associated with the face in the database. Moreover, if the unidentified face comes from a similar social context (e.g., if the photo containing the unidentified face was also uploaded by Bob), then this social context will also be similar to the strings associated with the known photo in the database. For example, if a new photo contains a face that produces the visual string "dkruiwl" (identical to one of the strings known to be associated with Joe's face in the example in the preceding paragraph), and the photo was uploaded by Bob, then the query "dkruiwl Bob" may be evaluated against the database of known, indexed photos. The more terms a face in the database matches (whether those terms are visual-based or social-context-based strings), the higher the face's score will be. The higher a face's score, the more likely it is that the face with the high score matches the unknown face that forms the basis for the query.

Although the visual-based strings can be created in any manner, one way to create the strings is to encode binary decisions about which side of several bounding planes a particular vector lies. For example, if the vector that represents a face is $<a_1, a_2, \ldots, a_n>$, then one might create, say, ten Boolean values based on decision points such as $a_7<3$, $a_{13}>6.2$, and so on. When all ten values have been created, the result may be a sequence of bits (e.g., 0110001010), where zero represents false and one represents true. This string of bits may be text-encoded in any appropriate manner, thereby producing a text string. Several sets of bounding planes may be used, so that each set of bounding planes generates a particular string. If the technique for creating a vector that quantifies facial features is effective, then faces that are similar will likely be in similar locations in the vector space. Vectors that are at similar locations in the vector space are likely to lie on the same side of several bounding planes, thereby producing at least some of the same strings.

When faces are stored in a database and have been indexed by strings (both visual-based and social-based strings), the database may be queried to support a variety of applications. In one example, the database may be queried to search for a photo of a particular person. In another example, the database may be queried to find faces that match an unknown face in a photo, in order to propose tags for that face.

Turning now to the drawings, FIG. 1 shows an example system in which faces may be analyzed and indexed. Photo store 102 contains a collection of photos 104. For example, photo store may be a photo database at a photo-sharing site or a social networking site, or may be a set of photo files on a local or shared hard drive.

Photo crawler 106 is a component that receives the photos 104 from photo store 102, and that analyzes the photos to extract faces from the photos 104. Photo crawler 106 may, for example, exist in the form of software that accesses photos from photo store 102, but could exist in any appropriate form. In addition to receiving the photos themselves, photo crawler 106 may perform and/or facilitate various analyses on the photos, as described below.

When photo crawler 106 extracts faces from photos 104, photo crawler 106 provides an image of a face 108 to face categorizer 110. Face categorizer 110 is a component (e.g., a software component) that quantifies facial features in an image and that creates a vector 112 that represents the quantification of facial features. Thus, each face might be represented by an n-dimensional vector such as $<a_1, a_2, \ldots, a_n>$. Face categorizer 110 may provide this vector 112 back to photo crawler 106.

When photo crawler receives vector 112, it may provide vector 112 to vector analyzer 114. Vector analyzer 114 may be a software component that creates strings based on vectors. With reference to the discussion above, vector analyzer 114 may maintain several sets of bounding planes, and may create strings based on where a particular vector lies in relation to the bounding planes—e.g., by creating Boolean values for a set of bounding planes, and then encoding the Boolean values into the form of text, as described above. Thus, vector analyzer 114 may create strings 116, and may provide these strings back to photo crawler 106. Photo crawler 106 then has a set of one or more strings that represent the visual appearance of a face.

Photo crawler 106 may also receive social data 118 concerning a photo. (As noted above, social data 118 may be used pursuant to appropriate permissions and/or disclosures in order to preserve and respect people's expectation of privacy.) Social data 118 may include various components. Example of these components include who is friends with whom (block 120), who belongs to the same network (block 122), who has working relationships with whom (block 124), who takes (or uploads, or tags) photos of whom (block 126), which people are known to appear in photos together (block 128), who e-mails whom (block 130), or any other appropriate information.

This social data 118 may be provided to photo crawler 106. Photo crawler may then use strings 116 and social data 118 to create a text representation 132 of what is known about a face. "What is known about a face" may include both the visual information about the face (as represented by strings 116), as well as social-contextual information about the face (as represented by social data 118). Thus, text representation 132 may contain text representing facial features 134, as well as text representing social context 136.

Each face (and/or each photo that contains one or more faces) may be indexed in a search index database 138. Thus, for each face, search index database 138 may contain the strings in association with the face (both the visually-based strings and the socially-based strings). The index may associate these strings with a particular face and/or photo, thereby making faces and/or photos text searchable based on both their visual and social characteristics. Thus, if one wants to find a face that has particular visual characteristics, one may do a text search on the string(s) that represent certain visual characteristics. (Such a search might arise, for example, if a face has been detected and analyzed in a new photo, and one wants to search the database to see what photos match that face.) Or, if one wants to find a face that arises in a particular social context, one may do a text search on terms like "Bob," "Susan," etc., that represent social context. In one example, both types of strings are used in a search, thereby allowing a text-based search engine to find faces that are particular relevant on both social and visual criteria.

Figure 2:
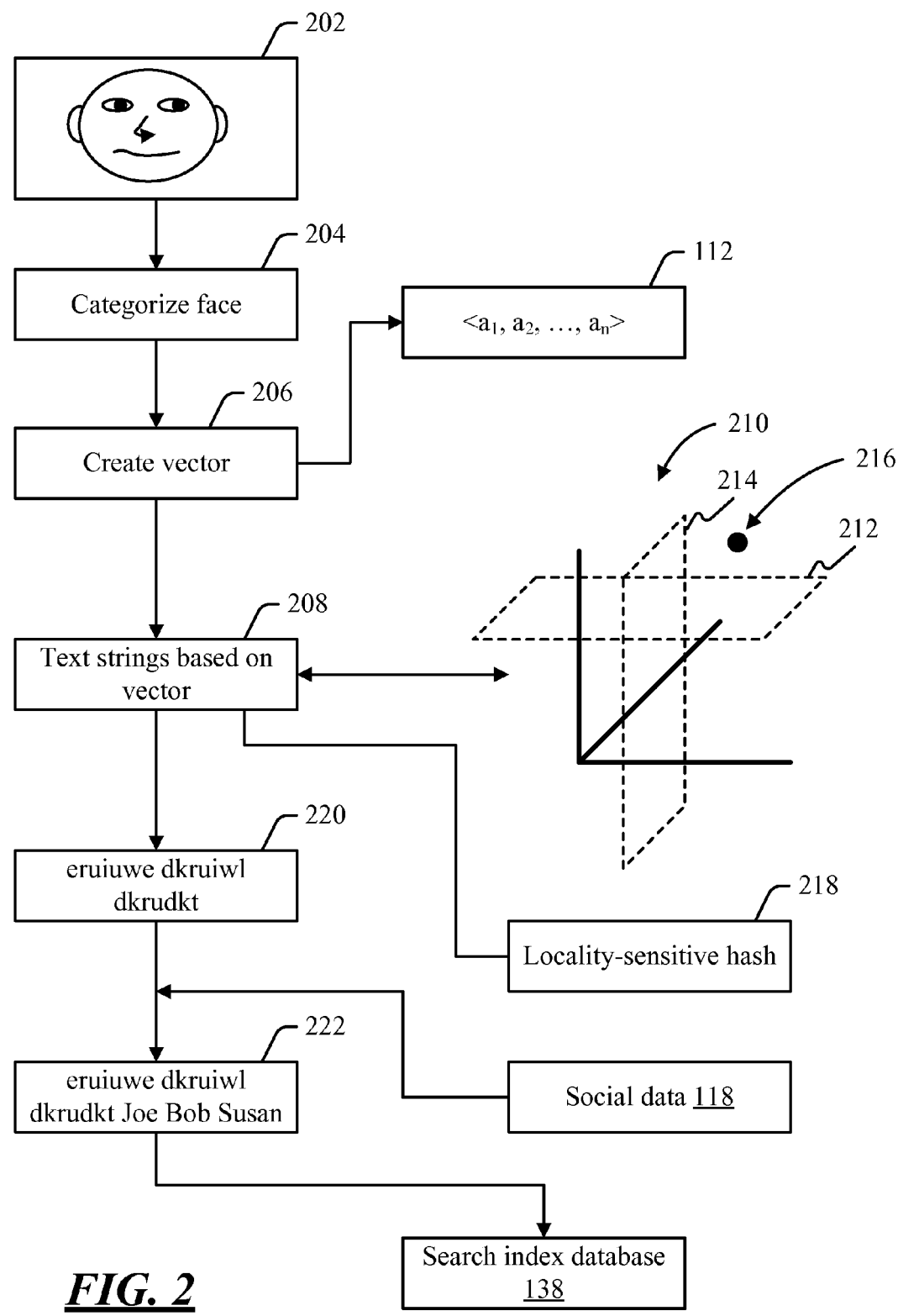
FIG. 2 is a flow diagram of an example process in which a face may be indexed by its visual and social characteristics.
Figure 3:
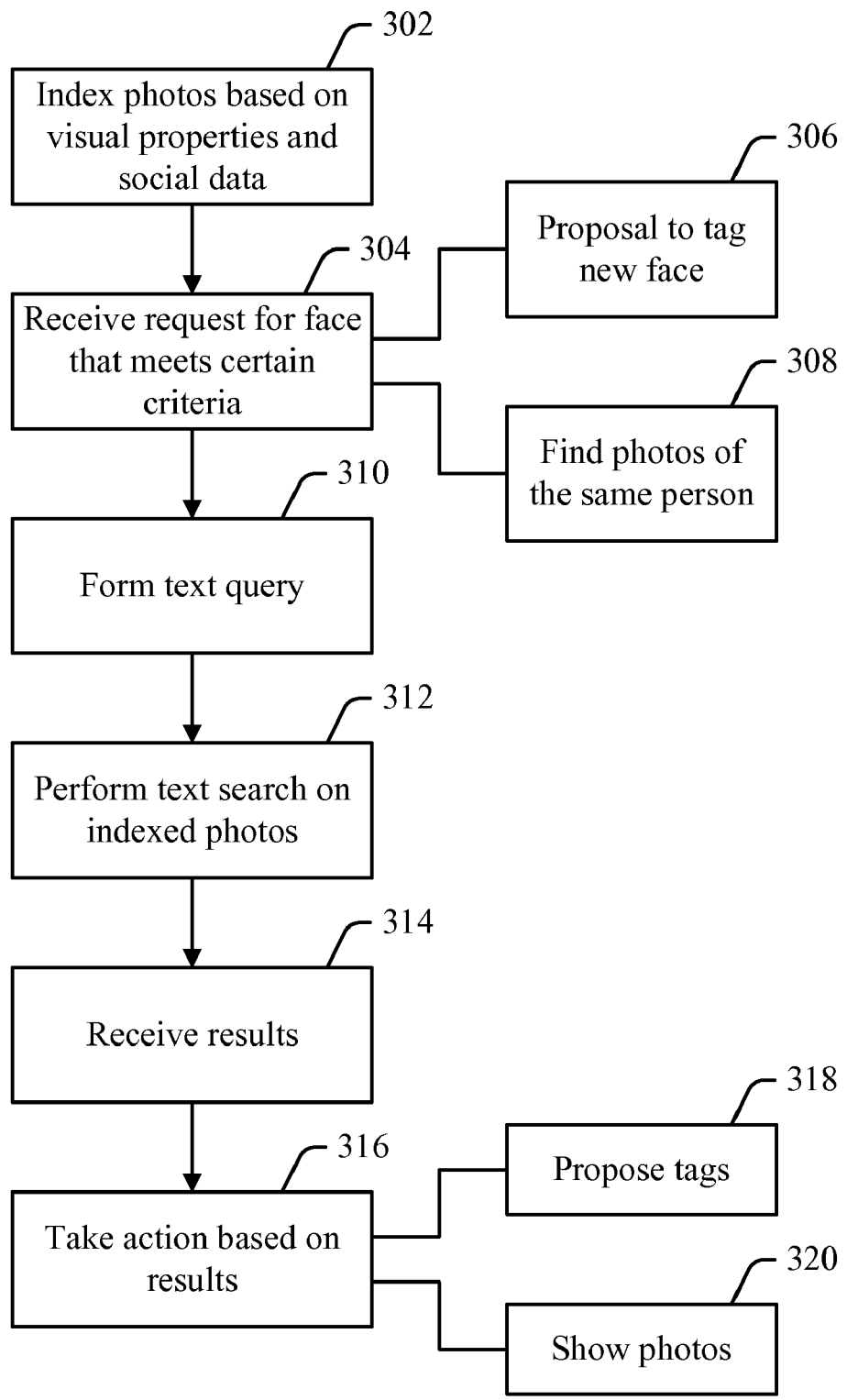
FIG. 3 is a flow diagram of an example process in which faces that are indexed by visual and social criteria may be used to provide results.

FIG. 2 shows an example process in which a face may be indexed by its visual and social characteristics. Before turning to a description of FIG. 2, it is noted that the flow diagrams contained herein (both in FIG. 2 and in FIG. 3) are described, by way of example, with reference to components shown in FIG. 1, although these processes may be carried out in any system and are not limited to the scenario shown in FIG. 1. Additionally, each of the flow diagrams in FIGS. 2-3 shows an example in which stages of a process are carried out in a particular order, as indicated by the lines connecting the blocks, but the various stages shown in these diagrams can be performed in any order, or in any combination or sub-combination.

Input to the process of FIG. 2 includes face 202. Face 202 may be provided by any appropriate mechanism. For example, face 202 may appear in a photograph that contains objects, background, one or more faces, etc., and may be extracted from that photograph using known processes. Or, an image of face 202 may be provided by manual mechanisms (e.g., a user's controlling cut-and-paste functions in a graphics program). Face 202 may be normalized as to size, color balance, etc., in order to facilitate analysis of face 202.

Face 202 may then be categorized (at 204). The categorization of face 202 may, for example, be performed by face categorizer 110 (shown in FIG. 1). The categorization of face 202 may include analysis of various measurable features of face 202—e.g., the ratio of the face's vertical-to-horizontal dimensions, the size of the ears (or nose, or eyes) relative to other parts of the face, evaluation of the colors that appear in the face (e.g., hair, eyes, lips, etc.), or any other aspect of a face that can be quantified. Once these aspects of face 202 have been quantified, the quantities themselves may be used (at 206) to create a vector 112 (which was first introduced in FIG. 1). The particular nature of the vector, and the significance of each component of the vector, may depend on the particular face categorization scheme that is being used. Regardless of the scheme used, however, the vector 112 that results from the face categorization process may contain sufficient information about a face such that visually similar faces would have similar vectors, and faces that are very different from each other visually would have different vectors.

At 208, text strings based on the vector may be created. As described above, the text representation may contain a set of strings, where each string is an encoding of a set of one or more side-of-plane decisions. Space 210 shows an example of how these side-of-plane decisions may be made.

For purposes of illustration, example space 210 is shown as a 3-dimensional space. In an actual face categorization scheme, the vector might have several dozen components, which corresponds to as many dimensions. E.g., if a face is represented by the vector $<a_1, \ldots, a_{50}>$, then the face is represented in a 50-dimensional space. However, for purposes of illustration, the 3-dimensional space 210 that is shown will demonstrate how side-of-plane decisions may be used.

In space 210, two planes 212 and 214 are shown. Point 216 represents the position of a particular vector in space 210. Thus, if space 210 is the space of all possible faces, and if vector 112 (which represents face 202) is mapped to point 216, then point 216 represents the position of face 202 in space 210. Although each point in space 210 has its own exact location, for the purpose of categorizing faces as similar or different it is possible to set up equivalence classes. Intersecting planes 212 and 214 divide space 210 into four regions, where each region is an equivalence class. Thus, in order to determine what class point 216 is in, one can ask whether point 216 lies above or below plane 212, and whether it lies to the left or right of plane 214. (In an actual implementation, these decisions would be made mathematically—e.g., if planes 212 and 214 intersect the x and z axes at 4 and 2, respectively, then "above" plane 212 might be defined as z>4, and "to the right of" plane 214 might be defined as x>2.) Thus, the position of point 216 may be described by the Boolean array {true,true}—i.e., "above plane 212"=true, and "right of plane 214"=true. If one imagines a 50-dimensional space where each set of side-of-plane decisions contains, say, ten decisions, then the result of each set of decisions would be a set of ten Boolean values. These values can be encoded numerically (e.g., as zero and one), and the numerically-encoded array of Boolean values can then be text-encoded to produce a string. This string represents, in effect, which equivalence class a particular face falls into for a given set of side-of-plane decisions. If there are, say, three sets of side-of-plane decisions, then three separate Boolean arrays could be produced, which would then be encoded as three separate strings. Each string represents which equivalence class the face falls into given a different set of side-of-plane decisions. If two faces have a single string in common, then they are in the same equivalence class under one set of side-of-plane decisions. If two faces have three strings in common, then they are in the same equivalence class under three sets of side-of-plane decisions (which indicates that the faces might be more similar to each other than they would be if they have only one string in common).

It will be understood that "plane", in this context, refers to an (n-1)-dimensional surface in n-dimensional space. In the example shown in FIG. 2, the space is 3-dimensional, so a "plane" happens to be the familiar 2-dimensional surface. However, in higher-dimensional spaces, the "plane" could actually be described as a hyper-plane—e.g., in a 50-dimensional space, the bounding "planes" would actually be 49-dimensional hyper-planes. However, to simplify the description herein, we will refer to bounding "planes", "side-of-plane decisions," etc., and it will be understood that the "plane" referred to is not limited to a 2-dimensional surface. In particular, the claims herein may refer to "planes" and "side-of-plane" decisions, and it will be understood that such a "plane" refers to any geometric object that can divide a space into regions, and specifically is not limited to 2-dimensional surfaces.

Although the text strings based on the vector may be created in any manner, in one example the text-string creation method comprises a locality-sensitive hash 218. When a locality-sensitive hash is used, vectors that are close to each other in space are likely to have similar strings, while vectors that are far from each other in space are likely to have different strings. That is, in a locality-sensitive hash, the similarity of the strings produced from different vectors is positively related to the proximity of the vectors.

Regardless of the technique used to create the strings, an example of the actual strings that are created is shown at 220. In this example, the strings that are created to represent the visual appearance of a face include "eruiuwe", "dkruiwl", and "dkrudkt".

Along with the strings that are based on a face's visual appearance, social data 118 may be included. As noted above, the social data may be based on facts such as who uploaded a photo, who appears with whom in a photo, who tagged whom in a photo, whether people in a photo appear in each other's contact lists, etc. (As noted above, such information may be used pursuant to appropriate permission and/or disclosure, in order to protect people's expectation of privacy in their information.) Thus, for a given face, if it is known that the photo containing the face was uploaded by Joe, that the face was tagged in the photo by Bob, and that Susan also appears in the photo, then the strings "Joe", "Bob", and "Susan" may be associated with the face. Thus, when the face is entered into search index database 138, the face may be associated (at 222) with the strings: "eruiuwe", "dkruiwl", "dkrudkt", "Joe", "Bob", and "Susan". Similarly, if it is determined that the contact list of some person (or some other type of list) provides relevant social context for the photo, then the names from the list (pursuant to the appropriate privacy disclosures/permissions alluded to above) may be expanded into a field so that the photo may be indexed by those names.

FIG. 3 shows an example process in which faces that are indexed by visual and social criteria may be used to provide results.

At 302, the faces are indexed. This indexing may be performed using the systems and techniques described above in connection with FIGS. 1 and 2, although the indexing could be performed in any appropriate manner.

At 304, a request may be received for a face that meets certain criteria. The criteria may be visual and/or social. The request may arise in any manner. One example way in which the request may arise is through a proposal to tag a new face (block 306). Thus, if a new photo is uploaded and faces appear in the photo that have not yet been tagged, then visual and/or social facts about the face may be identified. The visual facts may be the vector that represents the face's visual appearance and/or the strings (as described above) that represent side-of-plane decisions about that vector. The social facts may be derived from the photo or from the circumstances surrounding the uploading of the photo (e.g., who appears in the photo, who uploaded the photo, who tagged the other people in the photo, etc.). These visual and social facts about the face may be use to find proposed identities for the face (e.g., by finding faces that appear to be of the same person and for which an identity is known).

Another example way in which the request may arise is to find photos of a given person (block 308). Thus, if an unidentified face appears in a photo, one could seek to find other faces of the same person.

Regardless of the way in which the request arises, a text query may be formed based on the request (at 310). Thus, if a face has been extracted from a photo, and if a goal is to find people who may be the same person as that face, then strings derived from both visual and social facts about the face may be created, and a query may be formed based on those strings. Thus, if the visual elements of a face are represented by the strings "eruiuwe", "dkruiwl", and "dkrudkt", and the social elements of the face are represented by "Joe", "Bob", and "Susan", then the query "eruiuwe dkruiwl dkrudkt Joe Bob Susan" may be formed. Depending on how text queries are to be evaluated, different variations are possible. In one example, a result is considered to match the query if any of the query terms are associated with that result, so a face that has associated with it only the string "dkrudkt" would match the above query. In another example, all terms might be presumed to be conjunctive, unless specified otherwise. Thus, in order to allow a face to match the query if it has some visual and social features in common with the query, the query might be formed as "(eruiuwe OR dkruiwl OR dkrudkt) AND (Joe OR Bob OR Susan)". In another example, weights might be specified so that one particular aspects of the query (e.g., the visual aspects) could be weighted more heavily than other aspects. Thus, if the query processing system allows for explicit weighting, the query might be formed as "2.5* (eruiuwe OR dkruiwl OR dkrudkt) AND 1.0*(Joe OR Bob OR Susan)", thereby indicating that a match on one of the visual features is 2.5 times as significant as a match on the social features. (Or, weighting of specific features could be built into the scoring algorithm of the query processor, rather than making the weights explicit.)

At 312, a text search on indexed faces/photos may be performed using the query. At 314, results based on the query may be received. In one example, the results may be in a ranked order, so that the results that appear to match the query closely appear near the top of the result and result that match the query less well appear near the bottom. Thus, in the examples above, faces that are associated with many of the search terms (or many of the heavily-weighted search terms) might rank near the top, while faces that are associated with fewer of the search terms might rank near the bottom. In one example, the ranking of results may be done by a post-query action. Thus, a text search may be done to identify photos that satisfy the query, but—among those results—the actual ranking of results may be done by vector comparison between the query and each result. For example, vectors could be created to represent the frequency of terms in the query and each of the search results, and the results could be ranked in descending order of the cosine between the result's vector and the query vector (although other types of vector comparisons are possible). In another example, the ranking of results may be based on how many strings in the query match the strings by which a photo is indexed—e.g., photos that match a larger number of strings in the query might receive a higher ranking that photos that match a smaller number of strings.

At 316, a tangible action may be taken based on the results. For example, the results may be used to propose tags for faces in a photo that have not yet been identified (block 318). Such proposals might work by determining which faces that rank highly in the results are associated with known people, and providing a menu that allows a user to select from that list of known people as a tag for the as-yet-unknown face. The list of people could be presented in the order of the rankings, so that people associated with highly-ranked search results are presented before people associated with lower-ranked search results.

As another example of the action performed at 316, photos that appear to match an unidentified face may be shown to a user (at 320). For example, if a new photo contains an unidentified face, then visual and social features may be obtained from that face and may be encoded into text strings. The text strings may then be used in a query to search a database of known faces. Based on both the social and visual criteria in the query, faces that may be the same face as the unidentified face can be retrieved from the database and may be shown to the user. The user might then be asked to confirm whether the retrieved faces are the same person as the unidentified face. In general, the action that is taken at 316 may be based on the inclusion of a particular face among the results and/or based on the ranking of that face within the results.

Figure 4:
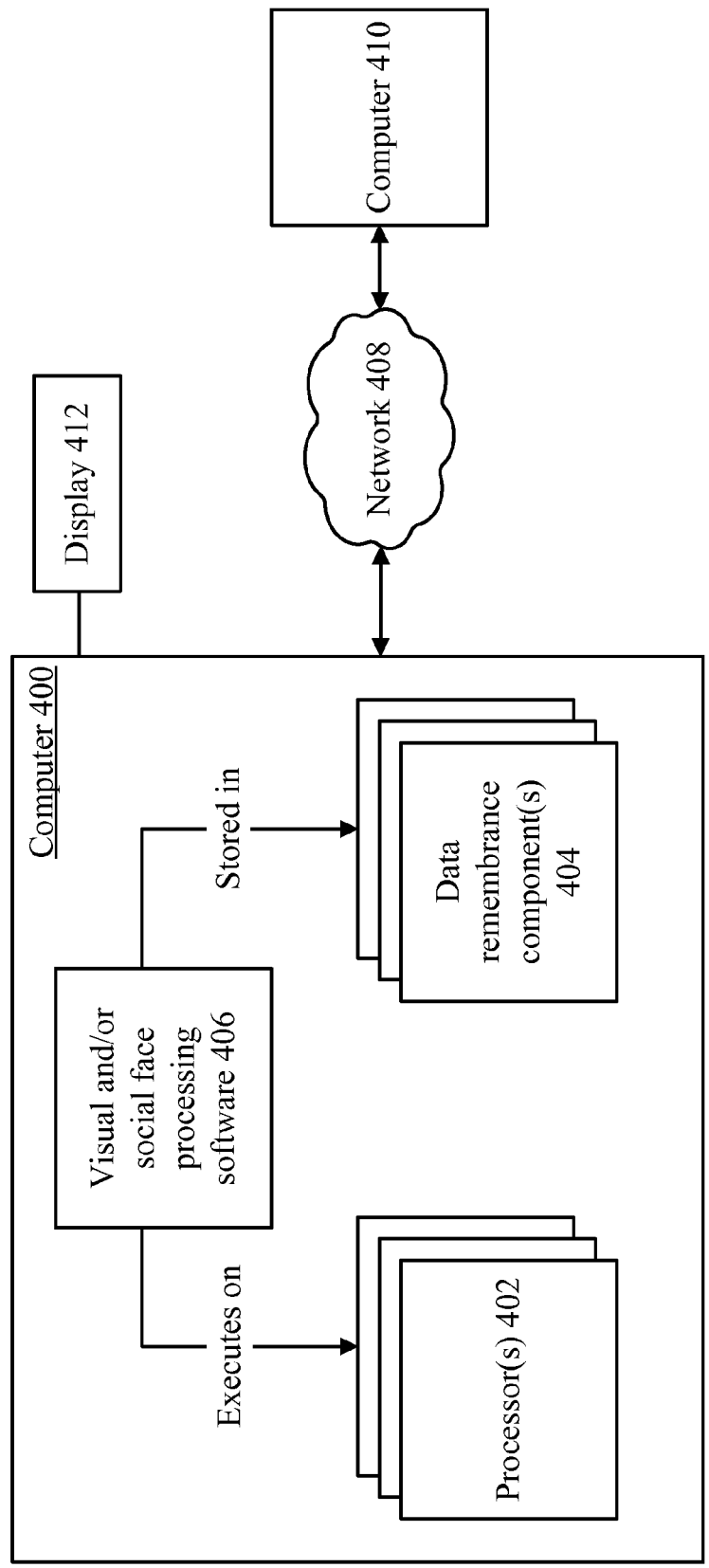
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is visual and/or social face processing software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to index faces based on visual and social data, wherein the executable instructions, when executed by a computer, cause the computer to perform acts comprising:
    analyzing an image of a first face to produce a vector that quantifies features of said first face;
    creating one or more first text strings that represent said vector, said creating of said one or more text strings comprising:
        defining a first set of planes in a space in which said vector exists;
        determining which side of each of said planes said vector lies;
        encoding which side of each of said planes said vector lies in a text string, said text string being one of said one or more first text strings;
        defining a plurality of sets of planes, said first set of planes being one of said plurality of sets of planes; and
        creating a separate text string based on side-of-plane decisions for each of said plurality of sets of planes;
    obtaining social data concerning a first photo in which said first face appears;
    associating said first face with said one or more first text strings and said social data;
    storing said first face in a database in association with said one or more first text strings and said social data;
    receiving an image of a second face;
    creating one or more second text strings based on a visual appearance of said second face;
    obtaining social data from a second photo in which said second face appears;
    creating a text query comprising said one or more second text strings and said social data;
    obtaining, based on said query, a set of results that comprises said first face, wherein including of said first face in said results is based on said first face being indexed by terms that are in said query; and
    performing an action based on said results, said action comprising providing, to a user, one or more faces that are of the same person as said second face, said first face being determined to be of the same person as said second face based on said first face's inclusion in said results or based on said first face's rank in said results.

2. The one or more computer-readable storage media of claim 1, wherein said creating of said one or more first text strings comprises:
    using a locality sensitive hash that generated text strings such that similarity of text strings generated for vectors is positively related to proximity of the vectors.

3. The one or more computer-readable storage media of claim 1, wherein said social data comprises who has uploaded said first photo, wherein said first face is indexed in said database by said one or more first text strings and by a name of a person who has uploaded said first photo.

4. The one or more computer-readable storage media of claim 1, wherein said social data is based on who has tagged said first photo, wherein said first face is indexed in said database by said one or more first text strings and by a name of a person who has tagged said first photo.

5. The one or more computer-readable storage media of claim 1, wherein said social data is based on who appears in said first photo with said first face, wherein said first face is indexed in said database by said one or more first text strings and by a name of a person who appears in said first photo.

6. The one or more computer-readable storage media of claim 1, wherein said social data is based on friend relationships in a social network to which said first photo has been uploaded.

7. The one or more computer-readable storage media of claim 1, wherein said action comprises:
    proposing, to said user, one or more tags for said second face.

8. A method of indexing and identifying faces based on visual and social data, the method comprising:
    extracting, using a processor, an image of a first face from a first photo;
    analyzing, using the processor, said first face to produce a vector that quantifies features of said first face;
    creating, using the processor, one or more first text strings based on said vector, said creating of said one or more text strings comprising:
        defining a first set of planes in a space in which said vector exists;
        determining which side of each of said planes said vector lies;
        encoding which side of each of said planes said vector lies in a text string, said text string being one of said one or more first text strings;
        defining a plurality of sets of planes, said first set of planes being one of said plurality of sets of planes; and
        creating a separate text string based on side-of-plane decisions for each of said plurality of sets of planes;
    obtaining social data concerning a first photo in which said first face appears;
    storing, in a database, an association between said one or more first text strings and said social data;
    receiving an image of a second face;
    creating one or more second text strings based on a visual appearance of said second face;
    creating a query that comprises said one or more second text strings and social data derived from a second photo in which said second face appears;
    receiving results based on said query, said results comprising said first face based on said first face's being associated with text in said query and being indexed by terms that are in said query; and
    performing, using the processor, an action based on said results, said action comprising providing, to a user, one or more faces that are of the same person as said second face, said first face being determined to be of the same person as said second face based on said first face's inclusion in said results or based on said first face's rank in said results.

9. The method of claim 8, wherein said creating of said one or more first text strings comprises using a locality-sensitive hash of said vector.

10. The method of claim 8, wherein said social data comprises an identity of a person who uploaded said first photo.

11. The method of claim 8, wherein said social data comprises an identity of a person who appears, with said first face, in said first photo.

12. The method of claim 8, wherein said social data comprises an identity of a person who has tagged said first photo.

13. A system for identifying a first face based on visual and social data, the system comprising:
    a memory;
    a processor;
    a database that stores faces indexed by text strings that represent visual characteristics of said faces and also by social data relating to said faces; and a face processing component that receives an image of said first face and of a second face, that creates a vector that represents a visual appearance of said first face, that creates one or more text strings that represent said vector, that creates one or more text strings based on a visual appearance of said second face, that obtains social data relating to a photo in which said first face appears, that forms a text query comprising said one or more text strings and said social data, that obtains, from said database, results based on said query, said results comprising said first face, said first face being included in said results based on said first base being indexed by terms that are in said query, said fact processing component taking an action based on said results, wherein said results comprise said second face, said action comprising providing, to a user, one or more faces that are of the same person as said second face, said first face being determined to be of the same person as said second face based on said first face's inclusion in said results or based on said first face's rank in said results, and wherein said text strings are created by defining a first set of planes in a space in which said vector exists, determining which side of each of said planes said vector lies, encoding which side of each of said planes said vector lies in a text string, defining a plurality of sets of planes in which said first set of planes are one of said plurality of sets of planes, and creating a separate text string based on side-of-plane decisions for each of said plurality of sets of planes.

14. The system of claim 13, wherein said action comprises proposing an identity associated with said second face as a tag for said first face.

* * * * *